United States Patent
Smith et al.

(10) Patent No.: US 7,915,205 B2
(45) Date of Patent: Mar. 29, 2011

(54) SINGLE FLUID ACIDIZING TREATMENT

(75) Inventors: Clayton Smith, Edmonton (CA); Darin Oswald, Edmonton (CA); Dan Skibinski, Calgary (CA); Nicole Sylvestre, Sherwood Park (CA)

(73) Assignee: Weatherford Engineered Chemistry Canada Ltd., Edmonton, Alberta (CA)

( * ) Notice: Subject to any disclaimer, the term of this patent is extended or adjusted under 35 U.S.C. 154(b) by 875 days.

(21) Appl. No.: 11/423,390

(22) Filed: Jun. 9, 2006

(65) Prior Publication Data

US 2006/0281636 A1  Dec. 14, 2006

Related U.S. Application Data

(60) Provisional application No. 60/595,150, filed on Jun. 9, 2005.

(51) Int. Cl.
C09K 8/524 (2006.01)
C09K 8/74 (2006.01)
C09K 8/72 (2006.01)
E21B 43/27 (2006.01)

(52) U.S. Cl. ........ 507/263; 507/269; 507/277; 507/904; 507/933; 507/934; 507/939; 166/307

(58) Field of Classification Search .................. 507/269, 507/277, 263, 904, 933, 934, 939; 166/307
See application file for complete search history.

(56) References Cited

U.S. PATENT DOCUMENTS

| | | | | |
|---|---|---|---|---|
| 3,819,520 A * | 6/1974 | Jones et al. | ............... | 507/266 |
| 3,970,148 A * | 7/1976 | Jones et al. | ............... | 166/307 |
| 4,071,746 A * | 1/1978 | Quinlan | ............... | 252/392 |
| 4,073,344 A * | 2/1978 | Hall | ............... | 166/307 |
| 4,737,265 A * | 4/1988 | Merchant et al. | ............... | 208/188 |
| 4,738,789 A * | 4/1988 | Jones | ............... | 507/254 |
| 4,919,827 A * | 4/1990 | Harms | ............... | 507/261 |
| 5,034,140 A * | 7/1991 | Gardner et al. | ............... | 507/244 |
| 5,152,907 A * | 10/1992 | Dulaney et al. | ............... | 507/261 |
| 6,192,987 B1 * | 2/2001 | Funkhouser et al. | ............... | 166/304 |

OTHER PUBLICATIONS

CIM-90 021572 Combination of selected solvents and mutual solvents successful in removing hydrocarbon based formation damage; CW Hamberline, Welcehm Inc.; DC Thomas, Welchem Inc.; MG Trovich, Welchem Inc; 1970.
SPE 4115 Gas well stimulation using coiled tubing and acid with a mutual solvent; DB Taylor, Shell Oil C., and RA Plummer, Nitrogen Oil Well Service Co., Copyright 1972.
SPE 5645 Corrosion inhibition of hydrochloric-hydroflouric acid/mutual solvent mixtures at elevated temperatures; Robert A. Woodroof, Jr. and James R. Baker, Members SPE-AIME, The Western Co. and Robert A. Jenkins, Jr. The Western Co.; 1975.
The effect of mutual solvents on adsorption in sandstone acidizing; BE Hall, Halliburton Services; Journal of Petroleum Technology, Dec. 1975, p. 1439-1442.
Performance of Amoco A-Sol in acidizing cleanup treatments; George E. King; Report F78-P-1 260-60-06(1) 532.912; Jan. 3, 1978.
A simplified method of designating matrix acidizing treatments for sandstones; GE King; F83-P-24 260-60-06 523.91 83075ART0102; Mar. 16, 1983.
Evaluation of mutual solvents used in acidizing; GE King; F83-P-26 260-60-06 532.91 83122ART0066; May 2, 1983.
Analysis and treatment of formation damage at Prudhoe Bay, Alaska; TN Tyler, SPE, Sohio Alaska Petroleum Co.; RR Metzger, Sohio Alaska Petroleum Co.; LR Twyford, Sohio Alaska Petroleum Co.; Journal of Petroleum Technology; Jun. 1985, pp. 1010-1018.
SPE 17153 The effects of corrosion inhibitors and mutual solvents on matrix acidizing treatments; DR Davies Koninklijke/Shell E&P Laboratorium; L Lievaart, Sarawak Shell Berhad and G. Nitters, Koninklijke/Shell E&P Laboratorium; Feb. 1988.
Adsorption and chlorination of mutual solvents used in acidizing; GE King, SPE, Amoco Production Co.; RM Lee, SPE, Welchem Inc.; SPE Petroleum Engineering, May 1988; pp. 205-209.
SPE 18816 Solvent and acid stimulation increase production in Los Angeles basin waterflood; GP Dayvault and DE Patterson, Chevron USA, Inc.; Apr. 1989.
SPE 23817 A new technique for the evaluation of acid additive packages; LR Houchin, WE Foxenburg, MJ Usie and Jun Zhao, OSCA Inc.; Feb. 26-27, 1992.
SPE 39592 A new material and novel technique for matrix stimulation in high-water-cut oil wells; FF Chang, SPE, RL Thomas, SPE, DK Fu, SPE, Schlumberger Dowell; Feb. 18-19, 1998.
SPE 50732 Influence of oilfield chemicals on the surface tension of stimulating fluids: BO Dabbousi, HA Nasr-El-Din, SPE, AS Al-Muhaish, Saudi Aramco: Feb. 16-19, 1999.
SPE 73705 Effect of acidizing additives on formation permeability during matrix treatments; Wayne W. Frenier and Donald G. Hill, SPE, Schlumberger; Feb. 21-21, 2002.
Minutes of the Nov. 27, 2002 CCQTA General Meeting; Oil field acidizing and organic chlorides; John Delorey, B.J. Services; Nov. 27, 2002.
SPE Distinguished Lecturer Program; Non-damaging matrix and fracturing acids; Malcolm Knopp, BJ Services Company Canada; http://www.spe.org/spe-site/spe/spe/events/dl/08_09_DL_Present_Knopp.pdf; also found at www.spe.org/dl—Archives for 2008-2009.

* cited by examiner

*Primary Examiner* — Timothy J. Kugel
*Assistant Examiner* — Aiqun Li
(74) *Attorney, Agent, or Firm* — Linda M. Thompson; Sean W. Goodwin

(57) ABSTRACT

An acidizing formulation for use in the stimulation of hydrocarbon production is stable when packaged and stored as a single fluid for periods exceeding one year. The formulation contains a miscibility solvent which substantially prevents any phase separation between the constituents and lack of dispersion of the additives in the fluid.

17 Claims, No Drawings

SINGLE FLUID ACIDIZING TREATMENT

CROSS REFERENCE TO RELATED APPLICATIONS

This application is a regular US Patent application claiming priority of U.S. Provisional Patent application Ser. No. 60/595,150, filed Jun. 9, 2005, the entirety of which is incorporated herein by reference.

FIELD OF THE INVENTION

Embodiments of the invention relate to fluids used for acidizing wellbores and formations and more particularly to acidizing formulations containing additives to prevent corrosion of wellbore equipment and additives to prevent sludge formation, precipitation and the like.

BACKGROUND OF THE INVENTION

Matrix acidizing treatments are conventionally performed to increase permeability of oil and gas formations, dissolve mineral deposits and to remove various types of damage therein. Mineral acids, such as hydrochloric acid (HCl), hydrofluoric acid (HF) and mixtures thereof called Mud Acid, and organic acids, such as acetic acid, have been used. The major function of an acidizing formulation is to remove damage by dissolving scale and formation fines and to stimulate the formation.

Due to the highly corrosive nature of the acids used in the acidizing treatment, anti-corrosive additives are typically added to the fluid to protect metal surfaces of wellbore tubulars and other equipment from corrosive attack.

Further, other additives may be added to the acidizing formulation to improve injectivity and return of the stimulation fluids. Other additives may include wetting agents, foaming agents, silt-suspending agents, anti-sludging agents, iron-control additives such as reducing or chelating agents, non-emulsifiers or emulsifiers depending upon the formulation and small amounts of mutual solvents.

Additives may be more or less soluble or dispersible in the aqueous acid solutions used for acidizing and thus may precipitate out or phase separate into an oil phase in the formation. Further, the products of the acidizing treatment may precipitate out or form sludges in the formation creating additional formation damage. Little specific literature is found regarding the stability of the formulations once mixed together prior to injection into the formation. Applicant however is aware that it is a standard industry practice to mix the formulation ingredients together immediately prior to injection or within 24-48 hours prior to injection due to the industry recognized instability of conventional acidizing formulations. So unstable are the formulations considered to be that in some cases Applicant is aware that formulations prepared only hours in advance of an expected use and which have been shipped only a few miles by truck to wellsites are discarded if the intended use does not occur as scheduled. Most often separate ingredients are shipped to the wellsite and the ingredients mixed together only as required and at the time required.

A significant amount of literature is found directed toward the use of mutual solvents in formation stimulation. Solvents such as ethylene glycol monobutyl ether (EGMBE) or commercial preparations of mixtures of alcohols such as A-SOL™ and SUPER A-SOL™ (available from Baker-Petrolite, Calgary, Alberta, Canada) have been used to assist in the removal or stripping of oil or hydrocarbon which coats scale or other deposits to be dissolved which prevent the acid from acting thereon or to retard the functionality of the acid so that it can be displaced further into the formation before the acid becomes spent. Typically, mutual solvents are used as a pre-flush or an after-flush alone or in combination with brine, acid or the like. While the mutual solvent may be combined with the acid or other fluids, preparation is typically on site immediately prior to injection and concentrations are reported to be typically about 3-10% (Dayvault et al., "Solvent and Acid Stimulation Increase Production in Los Angeles Basin Waterflood", SPE 18816 April 1989).

Aromatic solvents, typically used to strip hydrocarbons, are highly immiscible in aqueous solutions and therefore attempts to add aromatic solvents to aqueous acid solutions for this purpose would result in highly phase separated fluids, additives and the like partitioning between the phases and reducing the effectiveness of the acid treatment fluid.

Historically, mutual solvents, particularly EGMBE, have been used alone or in combination with a mud acid to increase permeability and leave the formation water-wet. It has also been reported that fines are thus prevented from moving back to the wellbore. Further, mutual solvents have been credited with deterring the formation of sludges and emulsions.

As reported by Dabbousi et al. in "Influence of Oilfield Chemicals on the Surface Tension of Stimulating Fluids", SPE 50732, February 1999, mutual solvents such as EGMBE at concentrations of 10% by weight or lower act to reduce the surface tension of organic acids, however concentrations above 10 wt % appeared to have no effect. G. E. King reported in "Evaluation of Mutual Solvents used in Acidizing" May 2, 1983 in Amoco report F83-P-26 that mutual solvents such as A-SOL™ may be used at 5% by volume in 15% HCl and at 10% by volume in 28% HCl. EGMBE and A-SOL™ were tested at 10% and 35% respectively in 15% HCL and 80% SUPER A-SOL™ in 15% HCl were also tested. In some cases the increased amounts of mutual solvent resulted in longer emulsion break times.

Additives are typically added to acidizing formulations to prevent unwanted damage to the formation or to the equipment used for the acidizing process, such as tubulars. As previously stated, corrosion inhibitors are added to acidizing formulations to assist in mitigation of corrosion of carbon steel tubing and casing found in wellbores. Typically, the industry standard for corrosion of carbon steel in contact with mineral acids such as HCl is below 0.05 pounds per square foot. The inhibitors chosen to prevent corrosion must dissolve and remain compatible with the acid and other additives to provide the standard level of protection at various temperatures, typically from ambient temperature to elevated downhole temperatures, to at least 150° C. A diverse number of chemicals have been used historically to prevent corrosion. Acetylenic alcohols, such as propargyl alcohol are the most widely reported. Other corrosion inhibitors used and reported are organic amines, dimer/trimer acids derived from tall oil or other bases, quaternary amines derived from coconut, canola, tallow, tall oil or other bases, fatty alcohols, derivatized quinolines, alkyl pyridines and oxyalkylated resin amines.

The presence of iron, particularly in the ferric form rather than the ferrous form, may increase the likelihood of an asphaltene sludge forming when the acid comes into contact with native oil. Should iron sludge form, the permeability of the formation may be severely impaired. Typically, as the acid spends, the pH begins to rise. Ferric sludge begins to form at pH above about 1.9, while ferrous sludge does not begin until a pH well above 5. Historically, acidizing treatments typically result in pH no higher than about 3.5 in the fluid returns after treatment and thus, it is of greater interest to prevent the formation of ferric sludge. Many types of iron control additives are known, particularly reducing additives and chelating additives. Historically additives have included erythorbic acid, citric acid, nitrilioacetic acid (NTA), ethylenediamine tetraaceteic acid (EDTA), glycolic acid, thioglycolic acid, 2-mercaptoethanol, thioglycerol, hypophosphorous acid, inorganics such as copper, antimony, bismuth, iodide and the like in combination with organics such as quaternary ammonium compounds and reducing agents, such as 2-mercaptoethanol and stannous chloride.

Sludge generally refers to any solids which are generated when the acid comes into contact with virgin oil in the subterranean formation. The sludge is typically formed by precipitation of wax/paraffins or asphaltenes due to destabilization or emulsions that occur, often as a result of intimate contact between aqueous and non-aqueous fluids. Many chemistries have been employed in acidizing formulations to prevent sludge formation. A primary characteristic of anti-sludge agents is that they act as dispersants. One such dispersant noted in the literature is dodecyl benzene sulphonic acid (DDBSA), which is dispersible in mineral acids rather than being soluble. DDBSA readily separates from acidizing formulations upon standing unless blended immediately prior to use on site. Instability of formulations containing DDBSA is particularly problematic at elevated temperatures such as are found in many formations.

Optionally, demuslifiers are added to acidizing formulations to prevent formation of emulsions when the aqueous acid comes into contact with hydrocarbons in the formation. The formation of emulsions is typically very detrimental to acidizing treatments. Even more problematic, emulsions may be stabilized by solids such as paraffins, asphaltenes, corrosion by-products and undissolved minerals from the formation. Conventional demulsifiers may include amine oxyalkalates, alkyl polyols, resin oxyalkalates, glycol esters, poly glycol derivatives and diepoxides. An API industry standard (API RP 42) requires that acidizing formulations exhibit a maximum emulsion break time of 15 minutes in the acid returns.

The addition of additives to an acidizing formulation must be carefully designed so to as to prevent precipitation of the additives in the fluid which may be detrimental and cause damage to the formation. Further, phase separation may result in additives partitioning between an aqueous and an oily phase and therefore being incapable of acting efficiently, if at all, for the purposes for which they are added.

Clearly what is desired is an acidizing and stripping formulation which can be premixed as a single fluid to reduce costs and hazards resulting from on-site preparation and which is stable for relatively long periods of time to reduce waste and costs related to disposal of unused, unstable formulations. Ideally, fluids used are miscible and the additives either soluble or stably dispersed therein.

SUMMARY

In an embodiment of the invention, a single fluid acidizing formulation comprises a relatively high concentration of mineral or organic acid, a miscibility solvent, a surfactant and at least an anti-corrosion additive which, when pre-mixed, is stable for extended periods and substantially for periods such as exceeding 1 year and possibly longer at both ambient and wellbore temperatures (when under wellbore pressure). The miscibility solvent comprises an effective amount of aromatics to strip oils and hydrocarbons from surfaces to be acidized and an effective amount of a blend of alcohols to ensure miscibility of the aromatics and additional additives in the aqueous acid solution. The surfactant is added to the formulation to assist in maintaining a stable dispersion of the additives therein. Preferably, the density of the formulation is below about 1 g/mL so as to permit gravity positioning of the formulation at areas of interest without significant dilution of the acid in water or brine situated in either the wellbore or the formation.

Therefore in a broad aspect of the invention an acidizing formulation for the stimulation of hydrocarbon production comprises: an aqueous acid solution, being from about 35 volume % to about 60 volume % of the formulation; an effective amount of at least a corrosion inhibitor; and a miscibility solvent being from about 40 volume % to about 65 volume % of the formulation for forming a substantially stable single fluid, the miscibility solvent further comprising: an effective amount of an aromatic solvent; a blend of an effective amount of short chain alcohols and an effective amount of long chain alcohols, the blend of alcohols acting to substantially prevent phase separation between the aromatic solvent and the aqueous acid solution; and an effective amount of a surfactant.

In one embodiment, the aqueous acid solution comprises about 40-60% of the total volume of the formulation. The miscibility solvent and the at least a corrosion inhibitor additive comprise the remainder of the formulation. The aromatic portion of the miscibility solvent comprises from about 10-20 wt % of the miscibility solvent so as to effectively strip the oils and hydrocarbons from the surfaces. The remainder of the miscibility solvent, being a blend of long and short chain alcohols acts to prevent phase separation between the aqueous acid and the aromatic solvent so as to provide a single miscible fluid. Additional additives are added, such as, but not limited to, an iron control agent, a demulsifier and an anti-sludge additive so as to provide a universal formulation capable of effective acidizing regardless the type of crude found in the formation.

DESCRIPTION OF EMBODIMENTS OF THE INVENTION

An acidizing formulation, primarily for the treatment of dolomitic formations and for removal of acid soluble wellbore and formation damage such as calcium carbonate buildup (scale) or precipitation of iron compounds, such as carbonates, oxides and sulphides, from both dolomitic and sandstone-type formations, is mixed as a single fluid treatment package which can be stored substantially indefinitely at ambient temperatures and which is stable at elevated borehole temperatures, often as high as 150° C.

Applicant has stored the single fluid acidizing formulation in excess of 72 hours, being the industry recognized limitation for conventional acidizing formulations, surprisingly without adverse effects to the stability of the formulation and further, has stored samples of the single fluid acidizing formulation for about one year without observable precipitation therein or significant phase separation and partitioning of additives therein.

The formulation comprises at least a mineral or organic acid, an anti-corrosive additive and a miscibility solvent. Preferably, a mineral acid such as hydrochloric acid (HCl) at either 15% concentration or 28% concentration is used. Other acids which can be used include mineral acid hydrofluoric acid (HF) and organic acids, including formic, acetic and citric acids. The miscibility solvent, comprising aromatic solvents and alcohols, is selected to have a relatively high amount of aromatic solvent therein to effectively strip oils and hydrocarbons which coat scale and deposits of interest. The miscibility solvent exposes said scale or deposits to the acid. Preferably, the aromatic solvent comprises about 10-20 wt % of the miscibility solvent and more preferably about 14-18 wt %. Preferably, the ratio of the miscibility solvent to corrosion inhibited acid is about 50/50 volume % which provides significant acid functionality. The alcohols are a blend of long and short chain alcohols selected from the group comprising aliphatic alcohols, glycols, polyglycols and glycol esters as well as mixtures thereof, preferably in a range of about 50-70 wt % of the miscibility solvent. The alcohols that can be used include methanol, ethanol, propanol, isopropanol, 1-butanol, 2-butanol, 1-pentanol, 2-pentanol, 3-pentanol, 1-hexanol, 2-ethylhexanol, 1-heptanol, 2-heptanol, 3-heptanol, 1-n-octanol, 2-n-octanol, nonyl alcohol, and 1-decanol, to maintain the miscibility between the aqueous acid and the aromatic solvent.

Further, a surfactant selected from the group consisting of fatty alcohol alkoxylates, fatty alcohol ethoxylates, nonylphenol ethoxylates, nonylphenol alkoxylates, block copolymers, reverse block copolymers, tetrols and reverse tetrols, and the like, is added to enhance the stability of the dispersion of the additives in the formulation. The surfactant can be added in a range from 10-40 wt % of the miscibility solvent and is preferably added in a range from 19-24 wt %.

Applicant believes that the miscibility solvent, particularly in amounts at about or greater than 50 volume %, acts to bridge between the additives in the formulation. Some of the additives are more acid dispersible rather than soluble in the aqueous acid itself and the miscibility solvent acts to hold these dispersible additives in solution rather than allowing them to precipitate or oil-out and degrade the functionality of the formulation.

In addition to the added stability of the formulation, as a result of the addition of the miscibility solvent, additional benefits result from the preferred formulation which has a density of less than about 1 g/mL, preferably about 0.95 g/mL, and a density greater than most oils encountered in the formations. Thus, produced brine may be displaced into the formation without any significant dilution of the acid which is being injected.

Historically, conventional 15% hydrochloric acid formulations, having a higher density than water or brine, and when injected into wellbores containing significant amounts of water, either produced or injected, fell through the column of water where the acid mixed and diluted in the water to a uniform concentration. The final concentration of the acid/water mixtures was dependant upon the amount of water in the wellbore at the time of the injection of the acid, however any amount of dilution resulted in a decrease in effectiveness of the acid to dissolve scale and the like. Further, if the acid formulation was to be used to treat scale in wellbore tubulars, the full strength acid, being heavier than the water in the tubular, would fall past the scale and into the sump of the well. When the volume was sufficient to reach the spot in the tubular to be treated, the concentration of the acid would be dependant upon the amount of dilution that had occurred.

In embodiments of the present invention, the preferred embodiment has a density of about 0.95 g/mL, being lower than fresh water, typically having a density of 1.0 g/mL and produced water, typically having a density of about 1.01 g/mL or greater. The single fluid acidizing formulation having a lower density will not fall through columns of water and can therefore be loaded or spotted at full strength above produced water on scale deposits within the tubulars regardless of the location. Further, the formulation can be used to displace water into the formation without dilution of the acid, thus presenting the formation to be treated with full strength acid and achieving greater dissolution of solids per cubic meter of acid used.

Advantageously, the acid formulation is stabilized by the miscibility solvent and surfactant contained therein at ambient temperatures for longterm storage. Further, the formulation is also stabilized at wellbore temperatures, often up to at least 150° C. Additives, such as DDBSA, which are conventionally used and which are often susceptible to precipitation out of solution or dispersion in oil in conventional acidizing formulations, even when small amounts of a miscibility solvent are added, are prevented from loss in embodiments of the present invention as a result of the addition of the miscibility solvent and the surfactant.

In a preferred embodiment of a single fluid acidizing formulation for use with 15% HCl, the formulation comprises:
 Miscibility solvent, preferably about 59% by volume (30-60% by vol.) and having aromatic solvents contained therein in an amount of about 15%, alcohols about 63% (about 35-65%) and surfactant about 23% (about 10-30%) in the miscibility solvent;
 Hydrochloric Acid (23 Be HCl), preferably about 13.8% by weight of the single fluid;
 Corrosion inhibitor, preferably about 1-5% by weight of the single fluid;
 Demuslifier, preferably about 0.04% by weight of the single fluid;
 Anti-sludge additive, preferably about 0.4% by weight of the single fluid;
 Iron control additive, preferably about 1.5% by weight of the single fluid; and
 Water making up the balance.

The preferred miscibility solvent comprises a mixture of organic, aromatic solvents and alcohols. Most preferably, the alcohols comprise about 5-15% long chain alcohols, being from about $C_8$ to about $C_{10}$ and 40-60% short chain alcohols, being from about $C_1$ to about $C_7$.

If 28% HCl is used, such as is typically used in gas wells, the preferred amounts of the additives must be altered to ensure appropriate corrosion inhibition and the like. The preferred formulation for 28% HCl is as follows:
 Miscibility solvent, preferably about 63.2% by volume; range 40-65% vol % and having aromatic solvents contained therein in an amount of about 15%, alcohols about 63% (about 35-65%) and surfactant about 23% (about 10-30%) in the miscibility solvent;
 Hydrochloric Acid (23 Be HCl), preferably about 24.5% by weight; range 20-30%
 Corrosion inhibitor, preferably about 1.1% by weight; range 0.5-5%
 anti-sludge additive, preferably about 0.4% by weight; range 0-3.0%
 Demulsifier, preferably about 0.03% by weight; range 0-1%
 Iron control additive, preferably about 1.3% by weight; range 0-5%; and
 Water making up the balance.

The preferred corrosion inhibitor comprises 35 wt % isopropyl alcohol, 5 wt % water, 20 wt % C12-alkyl pyridine, 20 wt % oxyalkylated resin amines and 20 wt % propargyl alcohol.

The preferred anti-sludge additive is dodecyl benzene sulphonic acid (DDBSA) and the preferred demulsifier is a combination of 70 wt % methanol, 20 wt % polymerized polyol (relative solubility #~7.0) and 5 wt % nonyl phenol resin adducts (relative solubility #~17.0).

The preferred iron control additive is stannous chloride which acts to reduce ferric ions to ferrous ions to prevent iron sludge from forming at the pH of the spent acid returned from the formation.

Depending upon formation characteristics, some or all of the aforementioned additives may be removed from the formulation.

Embodiments of the invention have the following advantages:
- the dispersion of the acid dispersible components is stabilized indefinitely and at temperatures which vary from ambient to 150° C.;
- reaction products resulting from the action of the acid on the deposits to be dissolved are stabilized in the fluids to permit flowing of the fluid and reaction products from the well after acidizing;
- elevated percentages of acid are possible in a miscible single fluid without phase separation, partitioning of additives therein or precipitation in the formation;
- the single fluid is capable of stripping hydrocarbon coating from surfaces of interest increasing the efficiency and effectives of the acid by allowing direct contact of the acid on the surface;
- the density of the fluid, being lower than that of fresh water and produced water/brine permits spotting of the acidizing formulation at zones of interest without significant dilution of the acid in formation and wellbore water and brine; and
- the formation is left water-wet following treatment so as to enhance the production of non-aqueous fluids due to the lowering of flow resistance forces, such as hydrocarbon fluids, that would otherwise be present.

In Use

A single fluid acidizing formulation is prepared according to an embodiment of the invention, including an aqueous acid solution, a miscibility solvent comprising an effective amount of aromatic solvents, preferably from about 10-20 wt % of the miscibility solvent, an effective amount of a blend of long and short chain alcohols and a surfactant and at least a corrosion inhibitor. The fluid is packaged for addition to the wellbore, such as in drums. The packaged fluid can be stored substantially for periods exceeding 1 year and possibly longer and readily shipped to a wellsite for pumping into a wellbore and formation without further preparation.

Preferably, additional additives including, but not limited to those disclosed above, are added in an amount effective in a majority of formations containing a wide variety of crude oils and thus the single fluid is substantially universal in applicability at temperatures ranging from ambient to at least 150° C. Formulations containing 15% acid may be prepared and sold separately from those prepared containing 28% acid which permit treatments at both conventional concentrations, currently known in the industry. Thus, the single fluid treatments avoid problems related to onsite preparation and to disposal if unused and do not need to be adjusted for alterations in the formation's characteristics.

The embodiments of the invention in which an exclusive property or privilege is claimed are defined as follows:

1. An acidizing formulation for the stimulation of hydrocarbon production comprising:
   an aqueous 15% hydrochloric acid solution being about 13.8% by weight of the formulation,
   a miscibility solvent being about 59% by volume of the formulation for forming a substantially stable single fluid, the miscibility solvent further comprising:
   about 15 wt % of an aromatic solvent:
   about 63 wt % of a blend of alcohols, the blend of alcohols being about 5 wt % to about 15 wt % long chain alcohols and about 40 wt % to about 60 wt % short chain alcohols; and
   about 19 wt % to about 24 wt % of a surfactant;
   a corrosion inhibitor being about 1.5 wt % of the formulation;
   a demulsifier being about 0.04 wt % of the formulation;
   an anti-sludge additive being about 0.4 wt % of the formulation;
   an iron control additive being about 1.5 wt % of the formulation; and
   the balance being water.

2. The acidizing formulation of claim 1 wherein the corrosion inhibitor comprises:
   35 wt % isopropyl alcohol;
   5 wt % water;
   20 wt % $C_{12}$-alkyl pyridine;
   20 wt % oxyalkylated resin amines; and
   20 wt % propargyl alcohol.

3. The acidizing formulation of claim 1 wherein the anti-sludge additive is dodecyl benzene sulphonic acid.

4. The acidizing formulation of claim 1 wherein the demulsifier comprises:
   70 wt % methanol;
   20 wt % polymerized polyol having a relative solubility number of about 7.0; and
   5 wt % nonyl phenol resin adducts having a relative solubility number of about 17.

5. The acidizing formulation of claim 1 wherein the iron control additive is stannous chloride.

6. The acidizing formulation of claim 1 wherein the density is less than about 1 g/mL.

7. The acidizing formulation of claim 1 wherein the short chain alcohols are $C_1$ to $C_7$ alcohols.

8. The acidizing formulation of claim 1 wherein the long chain alcohols are $C_8$ to about $C_{10}$ alcohols.

9. The acidizing formulation of claim 7 wherein the short chain alcohols are selected from the group consisting of methanol, ethanol, propanol, isopropanol, 1-butanol, 2-butanol, 3-heptanol, 3-pentanol, 1-hexanol, 1-heptanol, 2-heptanol and 3-heptanol.

10. The acidizing formulation of claim 8 wherein the long chain alcohols are selected from the group consisting of 2-ethylhexanol, 1-n-octanol, 2-n-octanol, nonyl alcohol and 1-decanol.

11. The acidizing formulation of claim 1 wherein the surfactant is selected from the group consisting of fatty alcohol alkoxylates, fatty alcohol ethoxylates, nonylphenol ethoxylates, nonylphenol alkoxylates, block copolymers, reverse block copolymers, tetrols and reverse tetrols.

12. An acidizing formulation for the stimulation of hydrocarbon production comprising:
   an aqueous 28% hydrochloric acid solution being about 24.5% by weight of the formulation,
   a miscibility solvent being about 63.2% by volume of the formulation for forming a substantially stable single fluid, the miscibility solvent further comprising:
   about 15 wt % of an aromatic solvent:
   about 63 wt % of a blend of alcohols, the blend of alcohols being about 5 wt % to about 15 wt % long chain alcohols and about 40 wt % to about 60 wt % short chain alcohols; and
   about 19 wt % to about 24 wt % of a surfactant;
   a corrosion inhibitor being about 1.1 wt % of the formulation;
   a demulsifier being about 0.03 wt % of the formulation;

an anti-sludge additive being about 0.4 wt % of the formulation;
an iron control additive being about 1.3 wt % of the formulation; and
the balance being water.

13. The acidizing formulation of claim 12 wherein the corrosion inhibitor comprises:
35 wt % isopropyl alcohol;
5 wt % water;
20 wt % $C_{12}$-alkyl pyridine;
20 wt % oxyalkylated resin amines; and
20 wt % propargyl alcohol.

14. The acidizing formulation of claim 12 wherein the anti-sludge additive is dodecyl benzene sulphonic acid.

15. The acidizing formulation of claim 12 wherein the demulsifier comprises:
70 wt % methanol;
20 wt % polymerized polyol having a relative solubility number of about 7.0; and
5 wt % nonyl phenol resin adducts having a relative solubility number of about 17.

16. The acidizing formulation of claim 12 wherein the iron control additive is stannous chloride.

17. The acidizing formulation of claim 12 wherein the surfactant is selected from the group consisting of fatty alcohol alkoxylates, fatty alcohol ethoxylates, nonylphenol ethoxylates, nonylphenol alkoxylates, block copolymers, reverse block copolymers, tetrols and reverse tetrols.

* * * * *